United States Patent Office 3,515,414
Patented June 2, 1970

3,515,414
FLEXIBLE SECTIONAL PIPE LINES
Casimir K. Kowalewski, Lincoln Park, N.J., assignor to Interspace Corporation, Parsippany, N.J., a corporation of Delaware
Filed Dec. 16, 1968, Ser. No. 784,142
Int. Cl. F16l 27/12
U.S. Cl. 285—165                                  2 Claims

ABSTRACT OF THE DISCLOSURE

A hollow universal joint unit having a telescopic pipe coupling integral with the socket of the unit coupled to a complementary telescopic pipe coupling of a large diameter pipe section, and a telescopic pipe coupling integral with the ball of the unit coupled to a complementary telescopic pipe coupling of another large diameter pipe section, each of said coupled pipe couplings allowing limited axial movements and deflections supplementing the greater deflection obtainable by the universal joint unit.

---

This invention relates to flexible sectional pipe lines, and improved joining means for coupling pipe sections employed in the construction and laying of subaqueous pipe.

Among the objects of the invention is to provide flexible joints which enable the joining of concrete pipe sections on shore or on a barge, the testing of the joints to ensure that they are leak-proof before submersion of connected pipe sections, and the laying of a continuous string of connected pipe sections on the bed of a body of water.

Another object is to provide joint assemblies affording extensibility between successive pipe sections as well as much greater deflection between the pipe sections than heretofore has been obtained in pipe lines made up of conventional pipe sections.

Another object is to provide a structurally simple ball and socket pipe joint of few parts which can be easily assembled into a unit complete with coupling members at its ends, and hydraulically tested before connection to a pipe section.

Concrete pipe sections having bell and spigot ends which are constructed to permit some extensibility and nominal deflection at the joint between the sections are known, as disclosed, for example, in the U.S. Pat. 3,129,-961, granted Apr. 21, 1964. Then again, concrete pipe sections having telescopically engaged coupling members have been employed for constructing pipe lines under water. In such pipe lines, connected pipe sections are tied together by a harness. The tying harness includes lugs anchored to the coupled sections and draw bolts extending between the lugs. The bolts and lugs are located at opposite sides of the sections on the spring line of the joint between coupled sections. A diver passes the bolts through holes in the lugs and takes up on the nuts to draw the bell of one pipe section over the spigot of the other. After the joint is fully closed, the nuts are backed away a distance sufficient to permit some axial play between the coupled pipe sections. Since the axis of deflection is on the spring line of the joint and the allowable deflection is relatively small, it is impractical in most cases to construct a pipe line above water and lower it to, or pull it onto, the bed of a body of water.

The novel joint-tying arrangement of the present invention comprises a ball and socket joint unit provided with a pipe coupling member at either end of the unit for coupling to pipe sections and by which limited extensibility and deflection are permitted between each of the pipe sections and the unit. The maximum articulation between adjacent pipe sections is cumulative of three sources of flexibility, the ball and socket joint unit and the pipe couplings at either end of the unit, each of which allows pivotal movement in all directions as in a universal joint.

According to the invention, the ball member and the socket member of the unit each incorporate, as an integral part thereof, a joint or coupling member for telescopically engaging a complementary joint or coupling member of a pipe section. It is an advantage of this construction that a ball and socket joint unit can be assembled and its security against leakage can be tested in the field or at the place of its manufacture. Furthermore, it can also be coupled to a pipe section and its joint therewith tested before placing the connected unit and pipe section under water.

Each coupling between a pipe section and either end of the ball and socket unit includes a bell having a cylindrical interior surface encompassing a spigot and an endless gasket or O-ring seated in an annular recess in the exterior surface of the spigot. The maximum diameter of the exterior surface of the spigot at the outboard side of the gasket is large enough to prevent displacement of the gasket by fluid pressure, but sufficiently less than the diameter of the interior surface of the bell to allow deflection between the bell and the spigot.

The extensibility of each connection of a pipe section relative to the ball and socket unit is limited by means of an annular shoulder on the spigot located outboard of the gasket, and an abutment or stop device secured to the bell adjacent its open end. The shoulder and the stop device at each end of the ball and socket unit provide two nearby sources of limited axial movement between successive pipe sections in a pipe line.

The foregoing and other objects, features and advantages of the present invention will be apparent from the following description of a preferred embodiment thereof and from the accompanying drawing.

Figure 1:
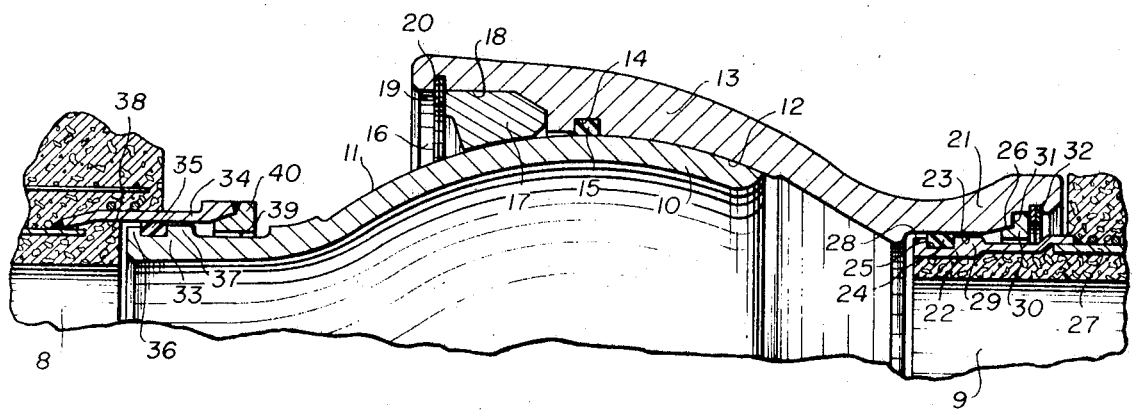
FIG. 1 is a section on the longitudinal axis of a ball and socket unit and aligned coupled ends of reinforced concrete pipe sections.
Figure 2:
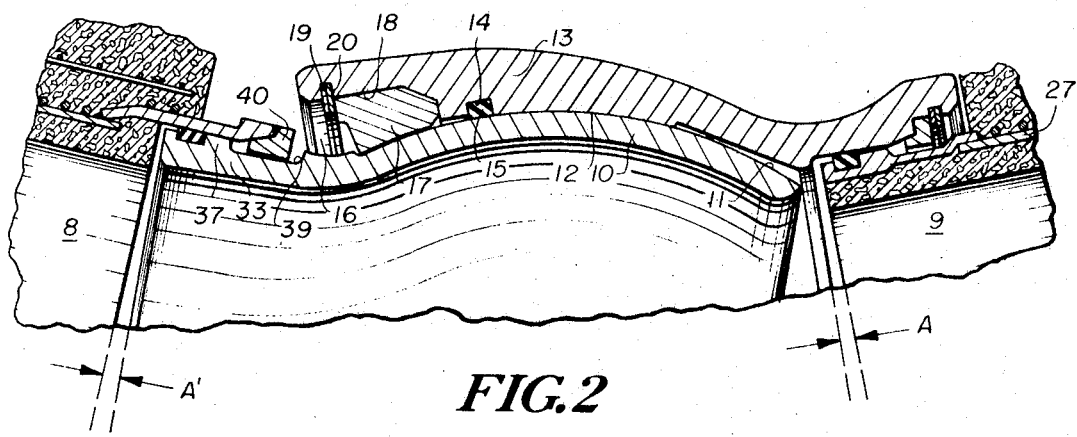
FIG. 2 is a sectional view illustrating the ball and socket unit of FIG. 1 in the same plane as in FIG. 1, but in a deflected position, and with the pipe sections deflected relative to the ball and socket unit.

The assembly of connective joints or couplings between adjacent pipe sections 8 and 9, as illustrated in FIGS. 1 and 2, includes a ball member 10 having an exterior spherical surface 11 engaging a similar surface 12 on the interior of a socket member 13. The socket member is provided with an annular groove 14 in the spherical surface 12 for containing a sealing ring 15 of rubber or other suitable elastomeric material. The sealing ring is a continuous ring of suitable cross-section and of such size that on assembly of the ball and socket it is deformed and forcibly pressed upon the exterior spherical surface of the ball member.

The socket member 13 is cupped to provide an annular recess 16 for receiving a continuous retaining or bearing ring 17 which engages the inner cylindrical surface 18 of the socket member and bears upon the spherical surface 11 of the ball member to hold the two members assembled. The retaining ring 17 is held in place by a snap ring 19 seated in a groove 20 in the socket member 13. The ring 19 is formed from a strip of spring steel which is rolled to a diameter that will cause the ring to seat on the bottom of the groove 20. The length of the strip is such that when it is rolled to size its ends are spaced apart sufficiently to enable the ring to be contracted for introduction to the annular recess 16 and thence to the groove 20. One or more individual split rings, or a double layered, single split ring may be used. A double layer ring may have about one and three quarter turns, and it is offset axially between its ends to provide the ring with parallel sides.

The retaining ring 17 and the recess 16 are precisely proportioned so that when the ring is locked in place within the recess its outer surface and its inner surface will respectively engage the socket and ball members and restrain relative movement between the two members to pivotal movement in all directions. In the embodiment illustrated and as demonstrated in FIG. 2, the extent of the pivotal movement between the socket and bell members in the plane of the drawing is such as to permit a deflection between the members of about 20° for 16-inch to 30-inch diameter pipes.

The outer end of the socket member 13 is formed as a bell 21 for forming a telescopic coupling or joint with a spigot ring 22 of the concrete pipe section 9. The bell has a cylindrical inner surface 23 for engaging an O-ring sealing ring 24 in an annular groove 25 in the exterior of the spigot ring 22, and a sloping surface 26 along which the sealing ring slides as the bell is advanced over the spigot ring when the joint is being closed. The spigot ring 22 is welded to a steel sleeve 27 which extends to, and is welded to a coupling ring (not shown) at the other end of the pipe section.

The groove 25 is located between a flange 28 and an annular ridge 29 on the spigot ring which clears the interior cylindrical surface 23 of the bell enough to allow deflection between the socket member 13 and the pipe section 9 as indicated by the angle A in FIG. 2.

The outboard shoulder of the ridge 29 is engageable by stop means rigidly secured to the bell to limit the withdrawal movement of the spigot ring from the bell. While the stop means may take any of a variety of forms the embodiment thereof illustrated in FIG. 1 is a continuous ring 30 held immovably against a shoulder 31 in the bell by one or more snap ring 32 contained by a groove in the bell. The diameter of the interior surface of the stop ring 30 is a little larger than that of the encompassed exterior surface of the spigot ring 22. The amount of extensibility of the coupling between the pipe section 9 and the socket member 13 is determined by the space separating the ridge 29 on the spigot ring from the stop ring 30 when the spigot is in its fully home position in the socket member.

The coupling of the ball and socket joint unit with the pipe section 8 is constructed to make a flexible, extensible joint of the type of coupling between the socket member 13 and the pipe section 9, except that in the embodiment of the invention which is illustrated in the drawing, the outer end of the ball member 10 is formed as a spigot 33 and is coupled with a complementary coupling member provided by a bell ring 34 on the pipe section 8.

The spigot 33 has an annular groove for containing an endless gasket 35 between a flange 36 and an annular ridge 37. The gasket is pressed and forcefully confined in the groove by the interior cylindrical surface 38 of the bell ring as in an O-ring seal.

Adjacent the outboard side of the ridge 37, the ball member 10 is provided with an annular recess 39 for accommodating a stop member 40 adapted to engage the ridge 37 to limit the extensibility of the joint. This stop member 40 is constituted as a continuous ring having a cross-sectional form to contact the end of the bell ring to which it is welded or otherwise attached.

The stop member 40 may be constituted in other suitable forms, such as spacially located blocks or bolts, for example. Clearance between the ridge 37 and the bell ring 34 and between the stop member 40 and the spigot 33 permits deflection of the pipe section 8 in respect to the ball member 10. The angle A' (FIG. 2) is indicative of the deflection between the axes of the ball member 10 and of the pipe section 8 in the embodiment shown.

Owing to the gain in flexibility afforded between successive pipe sections it is possible to install longer lengths of concrete pipe sections in lieu of standard lengths where the earth conditions and the grade of the terrain or of a river bottom is sufficiently gradual to justify doing so. In this way economy may be effected because joints are expensive and the fewer the joints in a pipe line of a given length, the less the total cost of the line.

Figure 3:
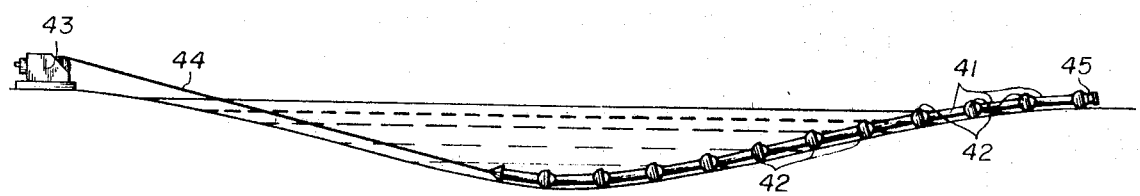
FIG. 3 is a diagrammatic illustration of a manner of laying a pipe line incorporating joints of the present invention.

The invention enables the elimination of barges, other floating equipment and the need for divers for coupling and laying a pipe line under water. Successive pipe sections 41 with ball and socket joint units 42, FIG. 3, can be coupled on the shore and advanced across a river bed by employing a winch 43 to pull a cable 44 passing through a series of coupled joint units and pipe sections and fastened to an anchor or back end 45 closing the last member of the assembled series to enter the water. The streamlined outside profile of the socket member 13 greatly facilitates this advancing operation, reduces the power requirements of winch and cable and eliminates the need of special sleds or similar implements. In this operation the extensible couplings remain drawn together telescopically during the installation operation, thus providing for the adjustment or the elongation of a portion or the entire length of a pipe line due to poor earth support, or the disturbance of the bed by water turbulences after a pipe line is placed.

Figure 4:
FIG. 4 diagrammatically illustrates another manner of laying a pipe line.

The invention also greatly facilitates the installation procedure for above-the-ground lines in difficult terrains like marshes and swamps and other conditions, where access is difficult or impossible for heavy construction equipment and bedding conditions are unpredictable FIG. 4 schematically illustrates the building and lowering of a pipe line into a body of water. A shore length 46 is assembled on the land and the portions which are to be submerged are assembled and tested on a barge 47 from which they are lowered and guided to their ultimate support bed. Owing to the relatively high joint deflection available, inordinate axial loading and strain on the pipe line is avoided.

While the form of apparatus herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. An extensible flexible pipe construction for facilitating the layer of a large diameter pipeline on a submerged bed, comprising a first pipe section having a telescopic pipe coupling member at an end, a second pipe section having a telescopic pipe coupling member at an end, a ball and socket joint unit attachably connected to each of said pipe sections, said ball and socket joint comprising a hollow ball member formed in one piece with a partially bulbous portion at one end and a tubular rim portion adjoining the bulbous portion, said bulbous portion having an exterior spherical surface, a socket member having an interior spherical surface slidable relative to said exterior surface of said ball member intermediate an annular recess at one end of the socket member and a tubular rim portion at its other end, a sealing ring seated in an annular groove in said socket member adjacent said interior spherical surface and compressed therein by said exterior spherical surface, said annular groove separated from said annular recess by an annular part of said socket member providing a wall of said groove at the outboard side of said sealing ring, means for retaining said ball member assembled in said socket member, said retaining means comprising a ring completely contained within said annular recess, said ring having an interior spherical surface conforming to and continuing the curvature of said interior spherical surface of said socket member so that the ball member is confined to pivot with respect to the socket member, said rim portion of said ball member formed as a telescopic pipe coupling member coupled to said coupling member of said first pipe section, said rim portion of said socket member formed as a telescopic pipe coupling coupled to said coupling member of said second pipe section, means for sealing said coupled coupling member against leakage, said coupled coupling members of said first pipe section and said ball member forming a flexible joint permitting deflection and limited axial movements of said first pipe section relative to said ball member, said coupled coupling members of said second pipe section and said socket member forming a flexible joint permitting deflection and limited axial movements of said second pipe section relative to said socket member, and means coacting between said coupled coupling members to limit the extent of the axial movements of said first pipe section relative to said ball member and of said second pipe section relative to said socket member.

2. An extensible flexible pipe construction according to claim 1, wherein said rim portion of said ball member is a pipe spigot and said rim portion of said socket member is a pipe bell.

References Cited

UNITED STATES PATENTS

| | | | |
|---|---|---|---|
| 290,196 | 12/1883 | Abel | 285—261 |
| 2,473,502 | 6/1949 | Bard | 285—271 X |
| 2,521,127 | 9/1950 | Price | 285—321 X |
| 2,955,850 | 11/1960 | Bellinger | 285—302 X |
| 3,273,917 | 9/1966 | Chakroff | 285—165 X |
| 3,353,848 | 11/1967 | Bleasby | 285—165 X |
| 3,427,051 | 2/1969 | White et al. | 285—165 |

FOREIGN PATENTS 926,966 10/1947 France.

DAVE W. AROLA, Primary Examiner

U.S. Cl. X.R.

285—261, 302

UNITED STATES PATENT OFFICE

Certificate of Correction

Patent No. 3515414　　　　　　　　　　Dated June 2, 1970

Casimir K. Kowalewski

It is certified that error appears in the above-identified patent and that said Letters Patent are hereby corrected as shown below:

In the heading, column 1, line 4, for "Interspace" read -- Interpace --;
Column 3, line 43, for "ring" read -- rings --;
Column 4, line 54, for "layer" read -- laying --;
　　line 59, after "joint" insert -- unit --;
　　line 65, before "surface" insert -- spherical --;
Column 5, lines 10 and 11, for "member" read -- members --.

OCT 27 1970

(SEAL)
Attest:

Edward M. Fletcher, Jr.
Attesting Officer

WILLIAM E. SCHUYLER, JR.
Commissioner of Patents